United States Patent [19]

Gelardi et al.

[11] 4,399,913
[45] Aug. 23, 1983

[54] CASSETTE CONTAINER WITH FLEXIBLE AND HINGED DRAWERS

[75] Inventors: Anthony L. Gelardi; Paul J. Gelardi, both of Cape Porpoise; Robert B. MacLeod, Jr., Biddeford, all of Me.

[73] Assignee: Shape Inc., Biddeford, Me.

[21] Appl. No.: 264,948

[22] Filed: May 18, 1981

[51] Int. Cl.³ .................... A47B 88/00; B65D 85/672
[52] U.S. Cl. .................................... 206/387; 206/1.5; 220/23.4; 220/339; 312/322
[58] Field of Search ............. 206/387, 389, 493, 309, 206/1.5; 220/339, 23.4, 23.6; 242/199; 24/230 R; 312/9, 13, 12, 17, 274, 330 R, 330 SM, 322

[56] References Cited

U.S. PATENT DOCUMENTS

| | | | |
|---|---|---|---|
| 3,017,763 | 1/1962 | Weil | 206/1.5 |
| 3,532,211 | 10/1970 | Gellert | 206/387 |
| 3,603,478 | 9/1971 | Connan | 221/87 |
| 3,642,337 | 2/1972 | Manheim | 206/387 |
| 3,836,222 | 9/1974 | Kuntze | 206/387 |
| 3,899,229 | 8/1975 | Ackeret | 206/387 |
| 3,912,077 | 10/1975 | Krynicki | 206/387 |
| 4,024,954 | 5/1977 | Staar | 206/387 |
| 4,026,615 | 5/1977 | Tazaki et al. | 206/387 |
| 4,030,601 | 6/1977 | Ackeret | 206/387 |
| 4,046,255 | 9/1977 | Ackeret | 206/387 |
| 4,067,629 | 1/1978 | Amatsu et al. | 206/387 |
| 4,077,685 | 3/1978 | Scire et al. | 312/330 R |
| 4,087,145 | 4/1978 | Weavers | 206/387 |
| 4,191,292 | 3/1980 | Schweizer | 206/387 |
| 4,275,943 | 6/1981 | Gelardi et al. | 206/387 |

FOREIGN PATENT DOCUMENTS

| | | | |
|---|---|---|---|
| 2615457 | 10/1976 | Fed. Rep. of Germany | 206/387 |
| 1130862 | 2/1957 | France | 220/339 |
| 1580720 | 7/1969 | France | 206/387 |
| 2365313 | 5/1978 | France | 312/330 R |

Primary Examiner—George E. Lowrance
Assistant Examiner—Jimmy G. Foster
Attorney, Agent, or Firm—Staas & Halsey

[57] ABSTRACT

A container for holding a cassette that includes a rectangular casing and a spring-biased drawer reciprocally and slidably received in the casing for holding a cassette in either of the short directions of the cassette, wherein the drawer has a front portion which extends downwardly to expose the cassette when the drawer is in its partially outwardly-extended cassette-exposing position from the casing. Hub-lock projections are formed on the pivotal front portion of the drawer to engage the hub-openings of a stored cassette only when the drawer is in its cassette-storing position. The hub-lock projections disengage or drop away from the cassette when the forward portion of the drawer bottom wall extends downwardly in the cassette-exposing position. The drawer is formed either of a single piece of molded material having a reduced thickness to form a hinge line between forward and front sections of the drawer, of two pieces of molded material comprising the front and rear portions of the drawer wherein the front section is mechanically hinged to the rear section, or of a single piece of flexible molded material wherein the drawer bottom wall is molded in the open cassette-exposing position for providing a natural downward bias in the forward portion of the molded material and flexibly upwardly to form a horizontal drawer bottom wall when the cassette is in the cassette-storing position. The container has a stop means and a locking means for limiting the movement of the drawer.

66 Claims, 9 Drawing Figures

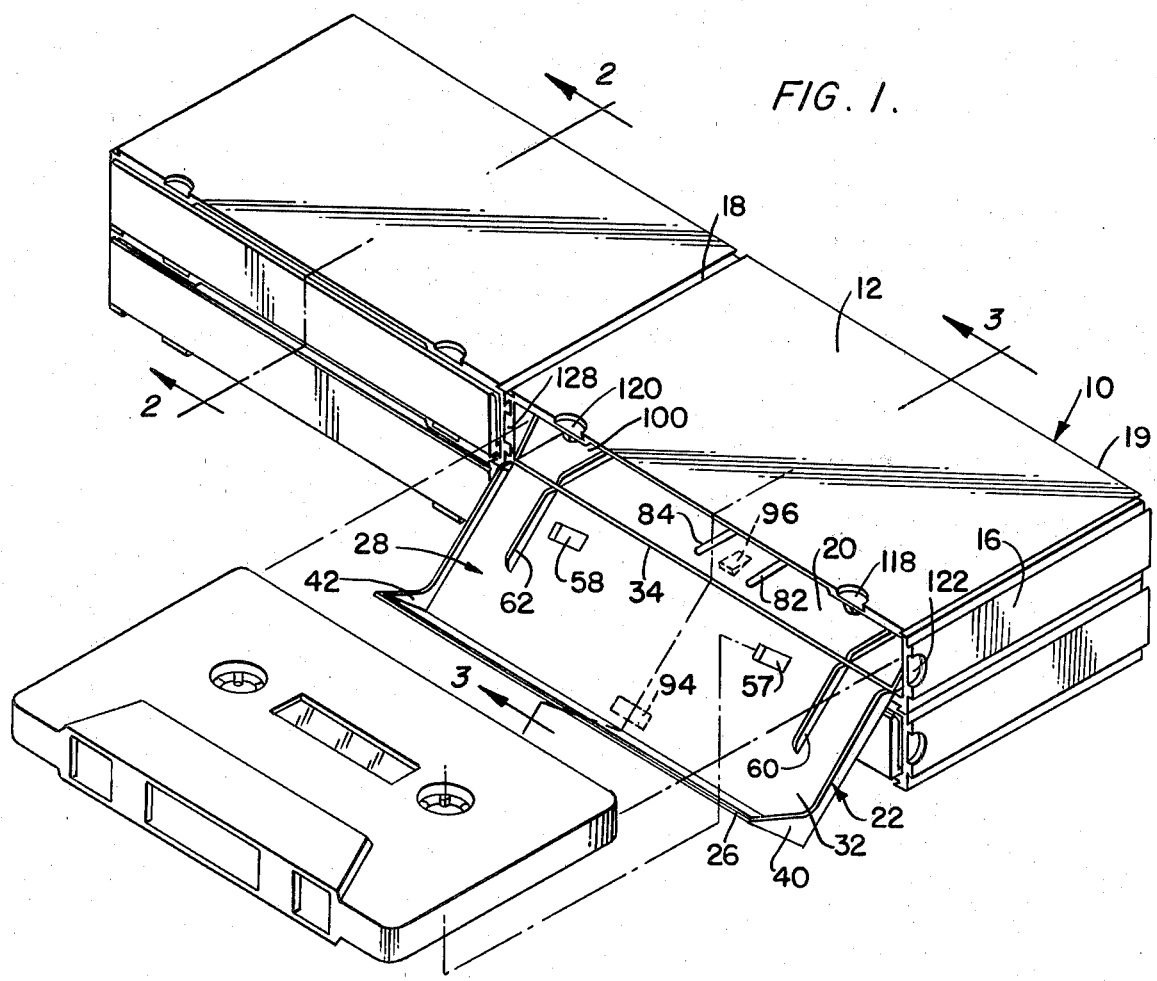
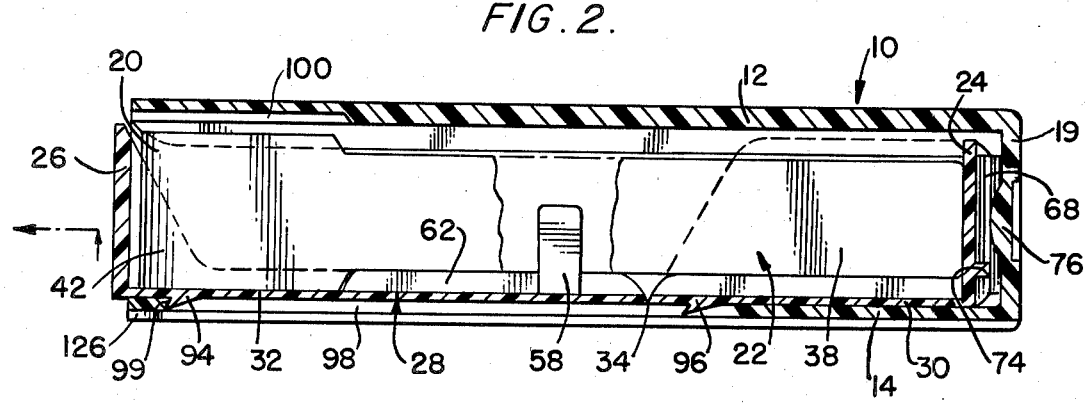

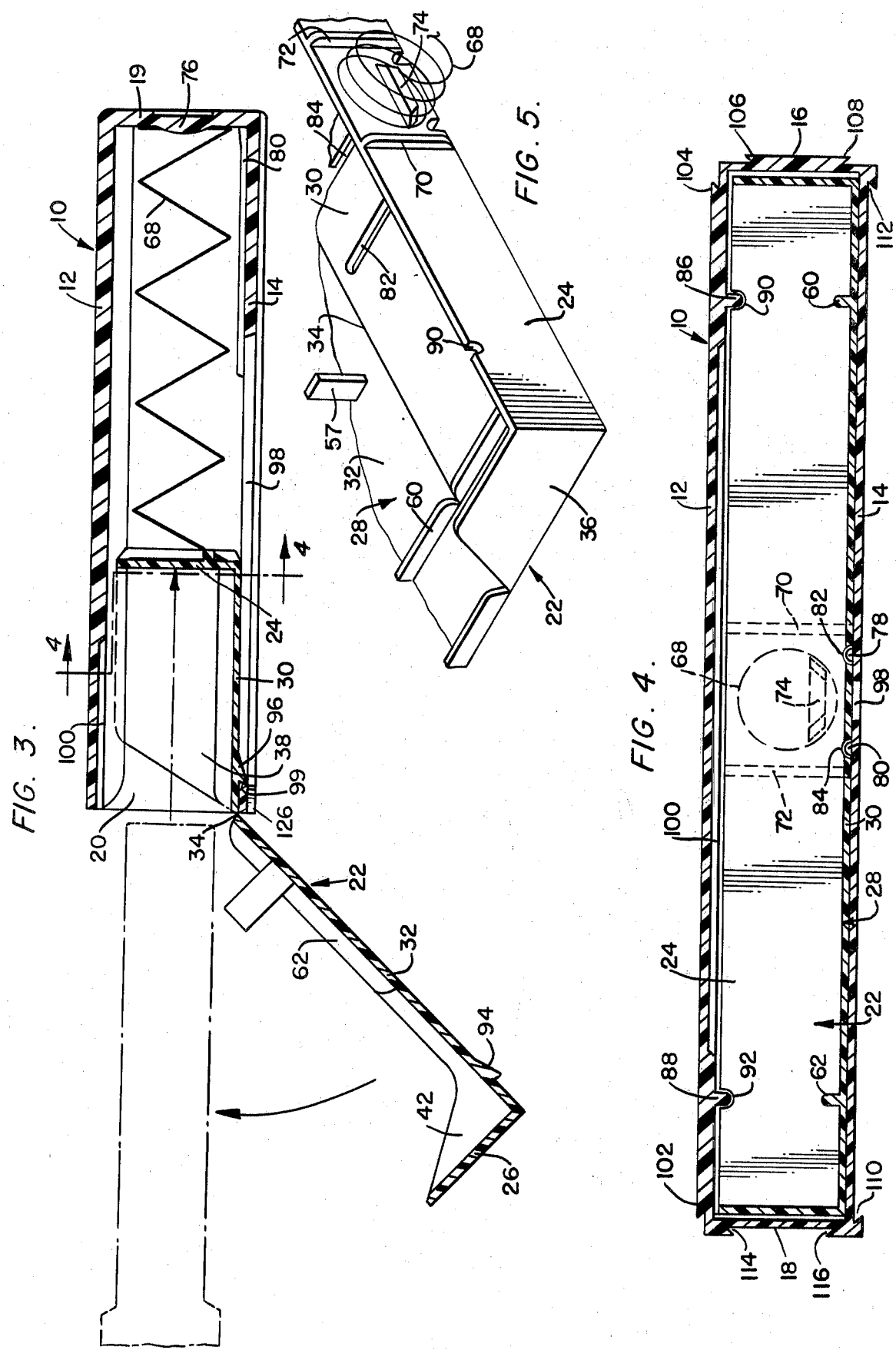

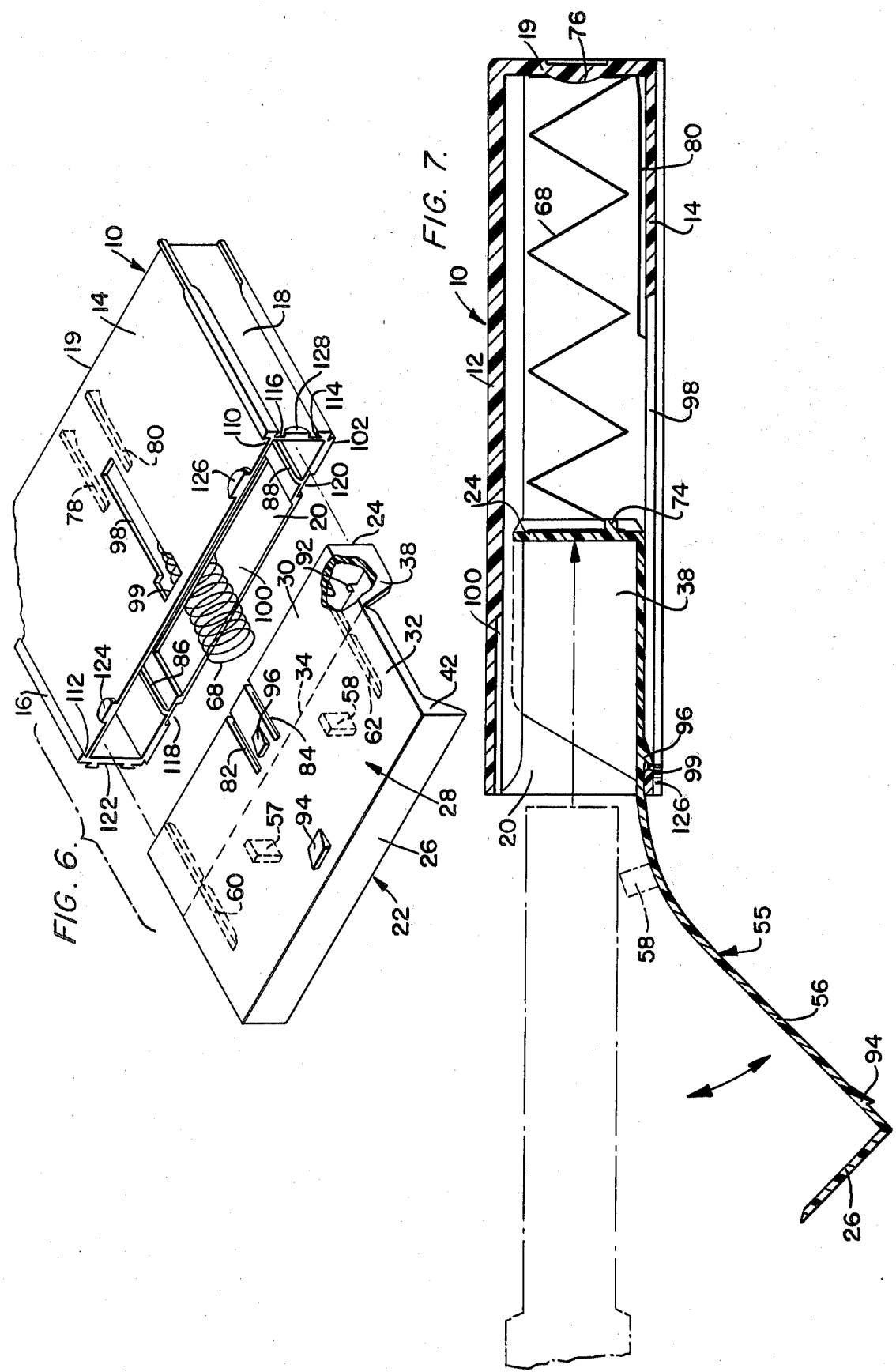

CASSETTE CONTAINER WITH FLEXIBLE AND HINGED DRAWERS

BACKGROUND OF THE INVENTION

The present invention relates to a container for a cassette. More particularly, the invention relates to a cassette container comprising a rectangular casing and a spring-biased drawer reciprocally and slidably received in the casing wherein the forward portion of the drawer bottom wall extends downwardly away from the cassette when the drawer is moved to an outwardly extended cassette-exposing position.

Containers having spring-biased drawers for holding a cassette are known in the art. Also known in the art are cassette containers have a frame-like bottomless slide reciprocally and slidably received in a casing for moving a cassette along the casing bottom wall in and out of the casing. These known cassette containers, however, continue to have significant problems and disadvantages in the art.

For example, the previously exposed cassette containers of the bottomless slide type continue to require storage of the cassette by inserting the cassette along the longitudinal direction thereof. The slide of this type of cassette container dictates fine alignment with the casing and is subject to distortion during various uses. Because of this, this cassette container requires more sophisticated molding of the components and a more complicated molding production of the cassette container is necessary which in turn means higher production and assembly costs. A further drawback in this cassette container is with respect to accessibility of the cassette for insertion in and out of the cassette container and visual inspection of the cassette during this operation.

The drawer-type cassette containers previously proposed continue to have significant disadvantages because of their complicated structural arrangement and overall dimensions being significantly larger than the stored cassette. Accordingly, these drawer-type cassette containers frequently require the stored cassette to be inserted in a particular direction in a rather impractical cumbersome and awkward manner of insertion into and removal from the cassette container. Moreover, the majority of these drawer-type cassette containers require that the cassette be stored in the container in only one prescribed orientation. That is, the tape cassette must first be placed with the head portion pointing toward the opening of the casing or the head portion of the cassette must be stored toward the rear of the casing. The above drawer-type cassette containers also do not necessarily provide easy grasping and manipulation of the cassette into and out of the casing with the operator using one hand. In addition, such drawer-type cassette containers have not heretofor had hub-lock projections for engaging the cassette in the stored position and wherein the hub-lock projections disengage from the cassette when the drawer is moved outwardly from the casing.

A cassette container which allows a stored cassette to be inserted into and removed in the short direction, allows either the thicker or thinner portion of the cassette to be inserted into the casing, provides hub-lock projections released from the stored cassette when the cassette is moved outwardly, and which provides an easier, less cumbersome way of inserting and removing the cassette eliminates many of the drawbacks of the current cassette containers. Moreover, this type of cassette container which has an overall reduced dimension and is simple in structural configuration, yet ensures that this container is easily and smoothly operated and durable under continued and different operating conditions also eliminates many of the drawbacks of the cassette containers known in the art. Moreover, a design of the above-type of cassette container, which is adaptable to high-volume, low-cost and easy-mass production of the component parts and assembly of the container would also be highly advantageous and eliminate many of the drawbacks of the known containers.

One of the most advantageous methods for producing a low-cost, high-volume cassette container of the above-type is by industrial molding of the component parts. It is in this environment where problems continue to occur in providing satisfactory cassette containers having all of the necessary and desirable features.

SUMMARY OF THE INVENTION

Accordingly, it is a primary object of this invention to eliminate the above-described problems in containers for cassettes yet maintain all of the required features and provide significant additional and desirable features for a cassette container.

A specific object of this invention is to provide a drawer-type cassette container which allows the cassette to be inserted in the short and in a reversible direction into the container.

Still another object of this invention is to provide a drawer-type cassette container having hub-lock projections which are releasably disengaged from the cassette when the drawer moves out to the cassette-exposing position.

A further object of this invention is to provide minimum overall dimensions for the above-type of cassette container.

Yet another object of this invention is to provide for easy grasping and manipulation of the cassette in and out of the drawer of the cassette container with the features set forth above.

A further object of this invention is to provide easy and simple assembly for a cassette container with the features set forth above consisting of three major components, namely, a casing, spring-biasing means, and a drawer having a front end extending downwardly away from the cassette in the cassette-exposing position.

Yet another object of this invention is to provide for smooth and easy operation of a cassette container with the features set forth above and to ensure continued satisfactory and proper operation by not being highly vulnerable to misalignment, warping and dimensional variations in the component parts.

Still a further object of this invention is to allow low cost mass-production of the components from moldable materials for a cassette container with the features set forth above.

Finally, it is an object of the invention to provide a cassette container having the above features wherein the casing is formed of a single piece of molded material and the drawer is formed of a single or two-piece molded material with all the subcomponents (except the spring) integrally molded as part of the casing or drawer.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of this invention, as embodied and broadly described herein, the container for a cassette comprises: (1) a rectangular casing; and (2) a spring-biased drawer reciprocally and slidably received in the casing for holding a cassette in either of the short directions of the cassette, wherein the drawer has a front portion which extends downwardly to expose the cassette when the drawer is in its partially outwardly-extended cassette-exposing position from the casing. More specifically, the container for this cassette in the preferred embodiment comprises: (1) a rectangular casing having top, bottom and side walls, a rear wall and an open front; (2) a drawer for holding a cassette, the drawer being reciprocally received in the casing and slidable between a cassette-storing position within the casing and a cassette-exposing position partially-extended outwardly and downwardly away from the cassette and the drawer comprising rear and front walls, and a bottom wall having a forward portion extending downwardly away from the cassette when the drawer is moved outwardly from the casing to its cassette-exposing position; (3) spring means for biasing the drawer toward the cassette-exposing position; (4) locking means for retaining the drawer in the cassette-storing position; and (5) stop means for limiting movement of the drawer to the cassette-exposing position.

In one embodiment of the cassette container, the drawer bottom wall comprises a rear section and a front section hinged to the rear section, the rear and forward sections forming the bottom wall of the drawer for holding the cassette when the drawer is in the cassette-storing position and wherein the front section drops downwardly from the rear section when the drawer is slidably moved outwardly toward the cassette-exposing position for providing access to the cassette. The rear and front sections of the drawer bottom wall may be formed of a single piece of molded material having a reduced thickness to form a hinge line between the sections running substantially parallel to the front rear walls of the drawer. On the other hand, the drawer bottom wall may be formed of two pieces of molded material comprising the front and rear sections and wherein the front section is mechanically hinged to the rear section.

In another embodiment of the cassette container, the drawer bottom wall is formed of a single piece of flexible molded material and wherein the drawer bottom wall is molded in the open cassette-exposing position for providing a natural downward bias in th forward portion of the molded material for the drawer bottom wall and flexible upwardly to form a horizontal drawer bottom wall when the drawer is in the cassette-storing position.

Preferably, the embodiments of the cassette container further comprise hub-lock means for lockingly engaging hub-openings of an inserted cassette only when the drawer is in the cassette-storing position, the hub-lock means comprising hub-lock projections mounted on the forward portion of the drawer bottom wall for engaging the hub-openings of the inserted cassette in the cassette-storing position and wherein the hub-lock projections drop or swing away from the cassette when the drawer is in the cassette-exposing position where the forward portion of the drawer bottom wall extends downwardly approximately 45° from the horizontal.

It is also preferable that a relief be formed along the inner front surface of the casing top wall so that when the cassette is inserted into the container with the head of the cassette facing the open front end of the casing, the drawer can be releasably unlocked by a slightly inward and upward motion without interference of the head of the cassette with the inner front surface of the casing top wall. The container also preferably comprises a pair of substantially parallel ribs formed on the inner surface of the drawer bottom wall running between the drawer front and rear walls and at a distance to allow the head of an inserted cassette to rest on the drawer bottom wall between the ribs.

Finally, the embodiments of the cassette container further comprise mating track means as described in greater detail hereinafter formed on the top and bottom and side walls of the casing for detachably connecting the casing to another similar casing horizontally or vertically to form a block, the track means forming dovetail joints and comprising male dovetails having mating edges formed on the outer longitudinal edges of the casing top wall and one of the casing side walls and female dovetails having mating edges formed on the outer longitudinal edges of the casing bottom wall and the other of the casing side walls. Locking means for positioning the casings to be connected together in a front even alignment are also provided, the locking and positioning means comprising female notches formed in the forward edge of the casing top wall and one of the casing side walls and male nodules formed at the forward edge of the casing bottom wall and the other of the casing side walls.

BRIEF DESCRIPTION OF THE DRAWINGS

The accompanying drawings, which are incorporated in and constitute a part of this invention, illustrate embodiments of the invention and, together with the description, serve to explain the principles of the invention.

FIG. 1 is a perspective view of a series of cassette containers in accordance with the invention showing them detachably connected in stacked and side-by-side relation to each other and illustrating in particular, the manner of inserting a cassette into a container and the downward position of the front section of the drawer bottom when the drawer is in its cassette-exposing position;

FIG. 2 is a side cross-sectional view of the cassette container in accordance with the invention taken along line 2—2 in FIG. 1, showing the cooperation of the spring, casing, drawer, locking means, and stop means of the cassette container when the drawer is in its cassette-storing position;

FIG. 3 is a side cross-sectional view of the cassette container in accordance with the invention taken along line 3—3 in FIG. 1, showing the cooperation of the spring, casing, drawer, locking means, and stop means of the cassette container when the drawer is in its partially outward and downwardly extended cassette-exposing position;

FIG. 4 is a front cross-sectional view of the cassette container in accordance with the invention taken along line 4—4 in FIG. 3, illustrating in particular the relief formed in the front inner surface of the casing top wall and the rear section of the drawer within the casing when the drawer is in its cassette-exposing position;

FIG. 5 is a partial perspective fragmented view of the drawer and spring of the cassette container made in accordance with the invention showing the front and rear sections of the drawer bottom wall and the location of the spring against the drawer rear wall;

FIG. 6 is a perspective fragmented bottom view of the cassette container made in accordance with the invention, illustrating in particular the spring, the components formed on the drawer and casing of the container, and the cooperation of the drawer with the spring and casing of the container;

FIG. 7 is a side cross-sectional view of a further embodiment of the cassette container in accordance with the invention, illustrating the cooperation of the spring, casing, drawer, locking means, and stop means of the cassette container when the drawer is in its partially outwardly and downwardly extended cassette-exposing position;

DETAILED DESCRIPTION OF THE PREFERRED EMBODIMENTS

Figures 8, 9:
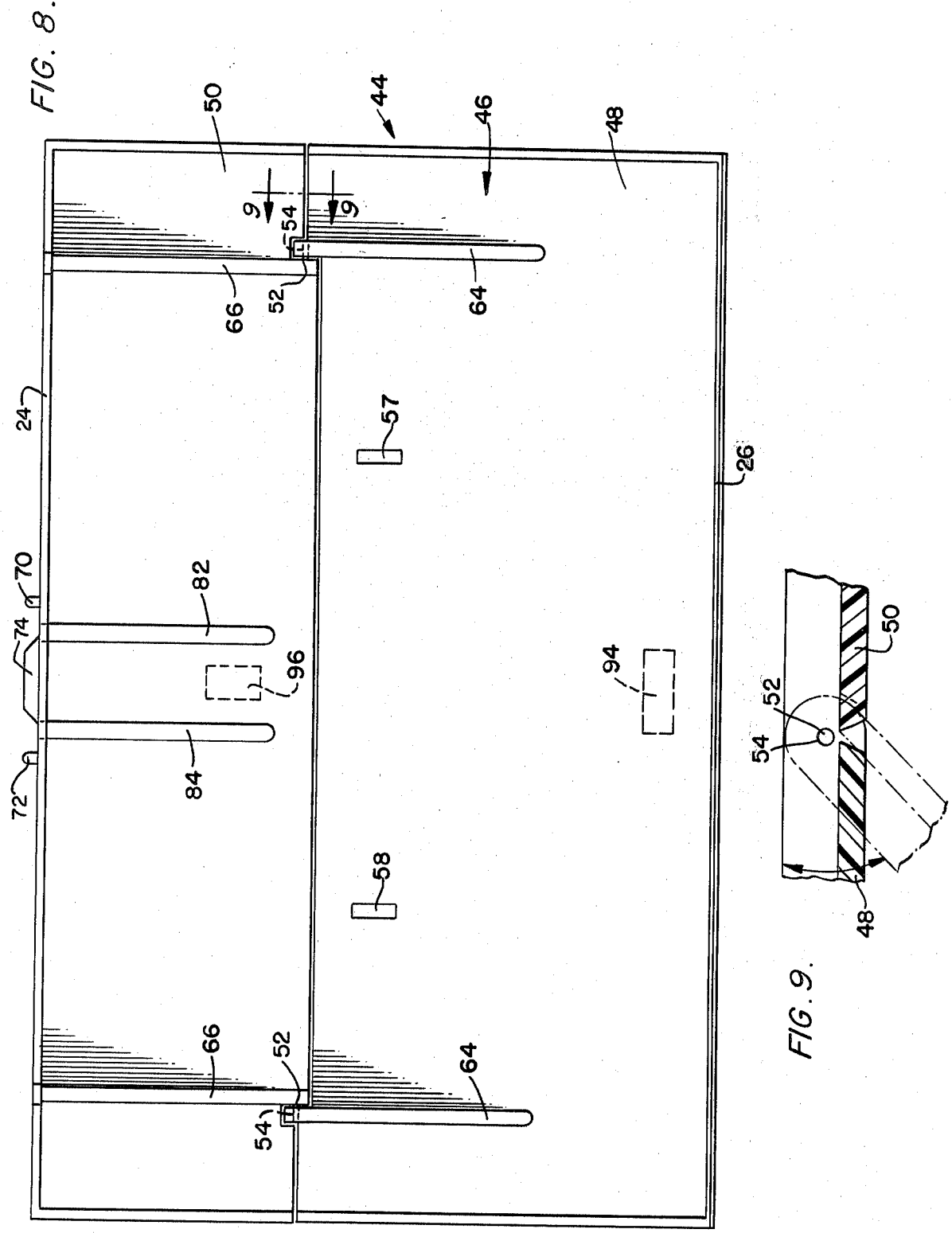
FIG. 8 is a top view of yet another embodiment of the cassette container made in accordance with the invention, wherein the drawer has a bottom wall formed of two pieces of molded material comprising the front and rear sections and wherein the front section is mechanically hinged to the rear section.
FIG. 9 is a partial side cross-sectional view of the embodiment of the cassette container of FIG. 8 taken along line 9—9, illustrating in particular the mechanical hinge between the front and rear sections of the drawer bottom wall, and the drawer front section in the position downwardly from the rear section when the drawer is in the cassette-exposing position.

Reference will now be made in detail to the present preferred embodiments of the invention, examples of which are illustrated in the accompanying drawings.

The cassette container, in accordance with the invention, basically comprises a casing and a spring-biased drawer reciprocally and slidably received in the casing for holding a cassette in either of the short directions of the cassette, wherein the drawer has a front portion which extends downwardly to expose the cassette when the drawer is in its partially outwardly-extended cassette-exposing position from the casing.

As will be described hereafter in greater detail, the drawer has a particular configuration and additional components are provided on the casing and drawer so that the drawer has a smooth and easy movement in and out of the casing and to ensure that the cassette container is durable under continued and different operating conditions. The design of the casing, drawer and other components, moreover, is such to allow high volume, low-cost and easy mass production and assembly of the container. This is achieved by being able to form the casing of a single piece of molded material and the drawer as a single piece or two pieces of molded material with all of the subcomponents (except the spring) integrally molded as part of the casing or drawer. The design is such to also provide a very compact and versatile cassette container. That is, the dimensions have been minimized for the cassette container, and the cassette container can be interlocked with other similar cassette containers to form a modular storage system.

Finally, the design of the cassette container is such to provide in combination a stored cassette to be inserted and removed in the short direction, either the thicker or thinner portion of the cassette to be inserted into the casing, hub-lock projections releasable from the stored cassette when the cassette is removed outwardly, and an easier, less cumbersome way of inserting and removing the cassette by the operator.

As herein embodied, and as best seen in FIGS. 1 and 6, the casing of the cassette container comprises a casing 10 rectangular in shape and having a top wall 12, a bottom wall 14, two side walls 16 and 18, a rear wall 19, and an open front end 20. A first embodiment of the drawer for the cassette container is illustrated in FIGS. 1-6 as drawer 22 comprising a rear wall 24, a front wall 26, and a bottom wall 28 having a rear section 30 and a front section 32 hinged to the rear section 30. The drawer 22 is reciprocally received in the casing 10 and slidable between a cassette-storing position (FIG. 2) within the casing 10 and a cassette-exposing position partially-extended outwardly and downwardly away from the cassette and casing 10 (FIG. 3). The outwardly- and downwardly-extended cassette-exposing position of the drawer 22 is also shown in FIG. 1 where a plurality of the cassette containers are shown releasably connected together to form a modular storage system.

The rear and forward sections 30 and 32, respectively, form the bottom wall of the drawer 22 for holding the cassette when the drawer is in the cassette-storing position and wherein the front section 32 drops downwardly from the rear section 30 when the drawer 22 is slidably moved outwardly toward the cassette-exposing position for providing access to the cassette. In this first embodiment of the cassette container, the rear and front sections 30 and 32 of the drawer bottom wall 28 are formed of a single piece of molded material having a reduced thickness to form a hinge line, designated by reference numeral 34, as best seen in FIGS. 1-3, 5 and 6, between the sections running substantially parallel to the front and rear walls 26 and 24, respectively, of the drawer 22. To ensure that the front section 32 of the drawer bottom wall 28 extends downwardly away from the cassette when the drawer is moved outwardly from the casing to its cassette-exposing position, it is highly advantageous to mold the drawer 22 in the open cassette-exposing position, as shown in FIG. 3, for providing a natural downward-hinged bias in the drawer bottom wall material. The molding is achieved in such a manner that the front section 32 of the drawer bottom wall 28 will extend downwardly approximately 45° from the horizontal when the drawer 22 is in the cassette-exposing position.

The molding and configuration of the drawer 22 is significant. It achieves the proper and easy and smooth movement of the drawer within the casing, and pivoting of the drawer into an outwardly-extended downward position for ready insertion and removal of the cassette. As best seen in FIG. 1, the cassette can be inserted or removed in the short direction, with the thicker or thinner portion of the cassette insertable into the casing in either direction. It is highly advantageous to provide storage of a cassette in a container in the short direction to allow easy access, more visibility of the cassette, and a longer dimension on either the drawer or the outer surface of the casing for labelling of the cassettebox container, a significant requirement in marketing this type of product. Moreover, and as will be described hereinafter, the configuration of this short drawer allowing a downwardly-extended cassette-exposing position provides even more labelling capabilities, and easier operation, access and less cumbersome insertion and removal of the cassette than previously provided. There is also the significant feature of providing hub-lock projections for the cassette which are automatically released from the stored cassette when the cassette is moved outwardly. A cassette container of this short-drawer type also allows for a lower-cost and an easier mass-produced cassette container, e.g., than a cassette container where the cassette is inserted in the longitudinal direction. The molding of the casing and drawer is simplified and improved because there is less stress and distortion and the like by molding in the short direction.

The cassette container embodiment having drawer 22, as best seen in FIGS. 1, 2, 3, 5, and 6, further comprises side walls 36 and 38 formed on the rear section 30 of the drawer bottom wall 28. These side walls 36 and 38 are particularly advantageous because they provide support and strength in the rear section 30 of the drawer bottom wall 28, without interference with access to the cassette to provide a proper downward extension of the hinged front section 32 in the cassette-exposing position and to ensure proper sliding movement of the drawer in and out of the casing without warping or distortion during various operational uses.

As can be seen from FIGS. 1, 2, 3, and 6, it is also preferable to provide partial side walls 40 and 42 on the drawer bottom front section 32 adjacent the drawer front wall 26. For similar reasons for using the rear side walls 36 and 38, the front side walls 40 and 42 provide structural support for the drawer front wall 26 which is pushed by the operator for release of the drawer when the drawer is in the cassette-storing position, as will be described hereinafter.

For purposes of producing a low-cost high-volume and inexpensive cassette container, the drawer 22, as illustrated in FIGS. 1-6, is preferably formed of a single piece of molded material, wherein the rear wall 24, front wall 26, side walls 36, 38, 40, and 42, and bottom wall 28 of the drawer 22 are formed as an integral piece of molded material. Notwithstanding the foregoing, an alternative embodiment of the drawer for the cassette container of this invention comprises drawer 44, as best seen in FIG. 8. The drawer 44 has a drawer bottom wall 46 which is formed of two pieces of molded material comprising the front and rear sections 48 and 50, respectively, and wherein the front section 48 is mechanically hinged to the rear section 50. The operation of this drawer 44 would be analogous to the drawer 22 of the first embodiment of the cassette container shown in FIGS. 1-6, in that the front section 48 extends downwardly away from the cassette when the drawer 44 is moved outwardly from the casing to its cassette-exposing position. The remaining components of this second cassette container embodiment can be the same as previously described above or described hereinafter for the first embodiment of the cassette container. Accordingly, the same reference numerals are used for common components. For example, the drawer 44 can again have side walls formed on the rear section 50 of the drawer bottom wall 46 and partial side support walls formed on the forward section 48 of the drawer bottom wall 46 adjacent the drawer front wall. Moreover, it can be seen that the partial front side support walls can be formed as an integral part of the drawer bottom wall front section and the rear side walls can be formed as an integral part of the drawer bottom wall rear section 50, respectively.

There are significant advantages in the utilization of drawer 44 in that there is versatility in the molding of the drawer 44 in two separate components to provide separate operational characteristics for the rear section 50 and front section 48. For example, the front sections 48 and 50 can be molded of different materials, where the rear section 50 is formed of a nylon or similar material to provide a lower coefficient of friction to the rear section for assisting in the sliding movement of the drawer 44 in the casing 10 and to ensure less distortion and warping of the rear section 50 during various subsequent variable temperature operating conditions and uses, such as in automobiles. The front section 48 could be made of a styrene clear material for providing more labelling area on the inside of the container or with various colors for marketing purposes.

For providing the mechanical hinge between the front and rear sections 48 and 50 in the drawer 44, as shown in FIG. 8, nodules 52 and corresponding mating holes 54 are integrally formed respectively on the front and rear sections 48 and 50 of the drawer bottom wall 46. Thus, it can be seen that the front section 48 is mechanically hinged to move downwardly by gravity from the rear section 50 when the drawer is moved outwardly into its cassette-exposing position. The mechanical hinge of the drawer 44 is formed in such a manner that the forward portion of the drawer bottom wall extends downwardly again approximately 45° from the horizontal when the drawer is in the cassette-exposing position. This can be accommodated by engagement of a portion of the front section 48 with an angular edge of the rear portion 50, as best seen in FIG. 9.

In yet another embodiment of the cassette container of this invention, as best seen in FIG. 7, a drawer 55 is formed of a single piece of flexible material molded in the open cassette-exposing position for providing a natural downwad bias in the forward portion of the molded material for the drawer bottom wall 56 and flexible upwardly to form a horizontal drawer bottom wall when the cassette is in the cassette-storing position. Similar to the cassette container embodiment shown in FIG. 8, the preferred embodiment of the cassette container shown in FIG. 7 has comparable components and functional operations as described previously for the first embodiment of the cassette container shown in FIGS. 1-6. Accordingly, no further reference is made hereto and the same reference numerals used in FIGS. 1-6 are used to identify common components in FIG. 7. It can be seen that one of the significant advantages of the embodiment of the cassette container shown in FIG. 7 is the simplicity of the construction of the drawer 55 where no mechanical hinge for the drawer bottom wall, as in the embodiment of FIG. 8, or hinge line for the drawer bottom wall, as in the embodiment of FIG. 1, are required.

One of the significant features of the cassette container made in accordance with the invention is to not only allow the cassette to be easily inserted into the casing in the short direction either with the cassette head first or head last for the advantages noted previously, but also to lockingly engage the hub-openings of this cassette inserted into the casing when the drawer is in the cassette-storing position. In designing hub-lock means for this type of cassette container, it was advantageous to ensure that the hub-lock means would always positively engage the cassette hub-openings no matter which way the cassette was inserted into the casing in the short direction, and engage the hub-openings *only* when the drawer was in its cassette-storing position.

Accordingly, and with further reference to FIGS. 1, 2, 3, 5, and 6, the cassette container of this invention further comprises hub-lock means for lockingly engaging the hub openings of an inserted cassette only when the drawer is in the cassette-storing position, wherein the hub-lock means includes a pair of hub-lock projections 57 and 58 both mounted on the pivotal front section 32 of the drawer bottom wall 28 for engaging the hub-openings of the inserted cassette in the cassette-storing position (FIG. 2). As best seen in FIGS. 1 and 3, these hub-lock projections 57 and 58 disengage or drop away from the cassette when the front section 32 of the drawer bottom wall 28 extends downwardly in the cassette-exposing position. To provide the proper orientation of the hub-lock projections 57 and 58 into the corresponding hub-openings of the cassette when the cassette is inserted into the container and the drawer moved into the casing, the hub-lock projections 57 and 58 can be formed with rounded upper edges for ensuring alignment of those projections into the corresponding cassette hub-openings.

It can be seen that the cassette container of the type described above having the hub-lock projections formed on a front portion of a drawer which drops downwardly away from the cassette provides significant advantages in the art. There is more visibility and easier access to the cassette for insertion and removal operations and hub-lock projections which disengage automatically from the cassette during movement of the drawer outwardly from the casing.

Yet a further significant feature of the cassette container in accordance with the invention is to provide proper horizontal storage of a cassette on the drawer bottom wall 28 with proper engagement with the hub-lock projections 57 and 58, yet maintain the versatility of inserting the cassette from the short direction in a reversible direction, that is, inserting either the thinner or thicker portion of the cassette toward the inside of the casing. To help achieve this feature, the cassette container, as herein embodied and as illustrated in FIGS. 1, 2, 5, and 6, further comprises a pair of guide and positioning ribs 60 and 62 formed on the inner surface of the drawer bottom wall 28 extending between the front and rear walls 26 and 24 of the drawer 22 for positioning the thinner portion of the cassette thereon and holding the cassette in the drawer in the horizontal position. Preferably, the ribs 60 and 62 run substantially parallel to each other and at a distance to allow the head of the cassette to rest on the inner surface drawer bottom wall 28 between the ribs 60 and 62 when the cassette is inserted either with the head towards the rear wall 24 of the drawer or the head facing the front wall 26 of the drawer. It can also be seen from FIGS. 1 and 5 that the ribs 60 and 62 are preferably formed along both the front section 32 and the rear section 30 of the drawer bottom wall 28, broken only along the hinge line 34 to allow the front section 32 to extend downwardly when the drawer 22 is moved to its cassette-exposing position. As can be seen, such guide ribs 60 are advantageously molded as integral components of the drawer bottom wall 28 to form a single molded drawer 22 in the cassette container embodiment of FIG. 1. Alternatively, in the container embodiment shown in FIG. 8, comparable guide ribs 64 and 66 are formed on the inner surface of the separate front sections 48 and 50 in such a manner to allow integral molding of the portions of the guide ribs 64 and 66 respectively on the front and rear sections 48 and 50.

In accordance with the invention, the cassette container further comprises spring means for biasing the drawer toward the cassette-exposing position. As herein embodied and as best seen in FIGS. 2, 3, and 6, the spring means of the cassette container comprises a spring 68 positioned between the casing rear wall 19 and the drawer rear wall 24 for biasing the drawer 22 toward its outwardly-extended cassette-exposing position. While any type of biasing spring might achieve this basic operation, it has been found in this particular situation where the drawer allows for insertion of the cassette in the short direction and to minimize the overall direction of the cassette container in the short direction, a spring which is advantageous is one which collapses inside itself and, more particularly, an hourglass-type spring. Use of a spring which collapses inside itself will minimize the required space for positioning of the spring 68 between the rear walls 19 and 24. Moreover, due to the large bases at the opposite ends of an hourglass-type spring, the spring has the additional advantage of eliminating the need for retaining devices to attach and hold the spring in position. Thus, the step of attaching a spring during assembly to such a retaining device has also been eliminated.

Nevertheless, to align the hourglass spring 68 between the casing and drawer rear walls 19 and 24, respectively, a pair of vertical ribs 70 and 72, as best seen in FIG. 5, are integrally formed on the outer central surface of the drawer rear wall 24 for positioning and alignment of one end of the spring therebetween. It is preferred also to provide a substantially horizontal rib 74 in the central portion between the vertical ribs 70 and 72 to orient and align the spring 68 against the drawer rear wall 24 during assembly of the cassette container. A knob, moreover, is integrally formed on the inner central surface of the casing rear wall 19 for positioning the other end of the spring 68 during assembly insertion against the casing 10 and for positive alignment between the rear walls 19 and 24, respectively, of the casing and drawer.

The cassette container further comprises spring guide means for providing easy and proper alignment of the spring means during assembly insertion into the casing. The spring guide means, as embodied herein and as best seen in FIGS. 4 and 6, includes a pair of guide ribs 78 and 80 integrally formed parallel to the casing side walls on the inner central surface of the casing bottom 14 wall extending from opposite sides of the spring vertical ribs 70 and 72 and knob 76 so that the spring 68 is positioned between these ribs 78 and 80. A pair of slots 82 and 84 are formed in the lower edge of the drawer rear wall 24 and the drawer bottom wall 28 to accommodate respectively the spring guide ribs 78 and 80 during movement of the drawer 22.

Because the pair of guide ribs 78 and 80 are used and the spring 68 is located between these ribs during movement of the drawer 22, the biasing force of the spring against the drawer and the movement of the drawer toward the front portion of the casing is stabilized. In the embodiment of the cassette container shown in FIGS. 1 to 6, the spring guide ribs 78 and 80 are formed only in the rear portion of the casing 10 and the drawer slots 82 and 84 are formed only in the rear portion of the drawer.

Since it is extremely important to provide continuous smooth operation of the drawer in the casing and extend the product life of said container, it has also been found desirable to provide the cassette container with drawer guide means for maintaining the drawer in its proper reciprocal sliding position in and out of the casing between the cassette-storing position and the cassette-exposing position. As embodied herein and as best seen in FIGS. 4 and 6, the drawer guide means comprises a pair of ribs 86 and 88 integrally formed parallel to the casing side walls on the inner surface of the casing top wall 12 extending along the casing top wall to the front edge of the casing open front end 20. A pair of clearance slots 90 and 92, as seen in FIGS. 5 and 6, are formed in the upper edge of the drawer rear wall 24 to accommodate respectively the drawer guide ribs 86 and 88 during the movement of the drawer 22.

To prevent the drawer 22 from being totally ejected from the casing 10 by the biasing force of the spring 68 acting against the drawer 22 and to provide a proper locking position of the drawer 22 in the cassette-storage position, the cassette container in accordance with this invention further comprises locking means for retaining the drawer in a cassette-storing position and stop means for limiting movement of the drawer to the cassette-exposing position. While there are various types of stop and locking means to achieve these basic operations, it was found advantageous to provide a particular configuration for the cassette container of this invention that allows storage of the cassette in the short direction in a drop-drawer in either the cassette head first or head last position.

Accordingly, and as embodied herein, the locking and stopping means comprise a projection 94 formed on the outer surface of the drawer bottom wall 28 near the forward end thereof and a projection 96 formed on the outer surface of the drawer bottom wall 28 near the rear end thereof. A recess 98 is formed in the inner surface of the casing bottom wall 14 for receiving the locking and stop projections 94 and 96 of the drawer wherein the locking projection 94 engages a forward edge 99 of the recess when the drawer is in the cassette-storing position and wherein the stop projection 96 engages the forward edge 99 of the recess for limiting further outward movement of the drawer 22 from the casing 10 in the cassette-exposing position.

As best seen in FIG. 2, the drawer 22 can be releasingly disengaged in the casing 10 from the cassette-stored locking position by exerting a slightly inward and upward pressure against the drawer front wall 26. In doing so, the locking projection 94 disengages from the front edge 99 of the recess 98. To provide a positive and sure locking action, the projection 94 is formed as a saw-tooth like projection with a width greater than that necessary for the stop projection 96. It can be seen that there is sufficient space between the drawer rear wall 24 and the casing rear wall 19, and particularly with the use of the hourglass spring 68, to allow sufficient play in the drawer 22 and a slightly inward and upward movement of the drawer to release the locking projection from the front edge of the recess. As previously stated, one of the significant features of the cassette container is to provide insertion of a cassette in the short direction with either the thicker or thinner portion of the cassette being first inserted into the casing. Accordingly, to accommodate the unlocking of the drawer 22 from the casing 10, when the cassette has been inserted with the head or thicker portion of the cassette at the forward end of the casing and drawer, as shown in FIG. 1, the cassette container further comprises a relief 100 formed along the inner front surface of the casing top wall 12 so that when the cassette is inserted into the container with the head of the cassette facing the open front end of the casing, the drawer 22 can be releasably unlocked by slightly inward and upward motion without interference of the cassette head with the inner front surface of the casing top wall. One of the significant features of this cassette container is that pressure can be exerted against substantially any part of the drawer front wall 12 to release the drawer from its locked cassette-storing position. Thus, it does not require the operator to apply pressure at a particular point on the drawer, as required on many known cassette containers.

As best seen in FIGS. 1 and 3, the stop projection 96, preferably a saw-tooth like projection similar to the locking projection 94, engages the front edge 99 of the recess 98 after the drawer is unlocked for establishing a pivotal point of the forward section 32 downwardly from the hinged rear section 30 of the drawer bottom wall 28 at the outer front edge of the casing bottom wall 14. Thus, it can be seen that the front edge 99 of the recess 98 is formed at a position to allow the front section 32 to move downwardly from the hinge line 34 from the bottom rear section 30 slightly out from or substantially at the front edge of the casing bottom wall 14. The location of the front edge 99 of the recess 98 is also designed in such a manner so that the drawer 22 in its locked cassette-storage position is located as substantially shown in FIG. 2 providing sufficient space to allow a slightly inward and upward movement for the unlocking operation.

To provide an even more positive locking and stopping action by the saw-tooth like projections 94 and 96 against the front edge 99 of the recess 98, the front edge of the recess is formed at an acute angle with the saw-tooth like projections 94 and 96 having a compatible angle formed thereon for mating with the front edge. This is preferable to forming the projections 94 and 96 and the front edge of the recess at substantial right angles from the horizontal position. To facilitate a better molding of this particular angle to the front edge 99 of the recess 98, it has been found that the recess 98 be formed as a through slot in the casing bottom wall, as best shown in FIG. 6. The recess 98 is formed as a slot in the casing bottom wall 14 with a T-shaped configuration with the front portion thereof of a width approximately the same as the locking projection 94 and with the recess 98 formed along the casing bottom wall 14 from the front to the rear ends of the casing to allow the stopping projection 96 to move in the recess 98 until engagement with the front edge thereof, as best seen in FIGS. 2 and 3. Forming the recess 98 as a through slot will not interfere with the operation of the drawer, nor create disadvantages in storage of the cassette since the bottom wall 28 of the drawer 22 will prevent dust and the like from entering into the cassette container.

It has been known to store a plurality of cassettes in a block or modular form where a plurality of cassette storage containers is provided. One method is to detachably connect separate cassette containers one above the other and sideways in a modular storage system. It is highly advantageous to use the detachably connectable separate cassette containers so that the modular block of containers can be added to and subtracted from depending upon the desired storage, as well as having the ability to utilize separately only one of the cassette containers. One of the particular problems to date in applying the modular-type system to cassette containers which provide for insertion of the cassette in a short direction is to provide a cassette container providing both easy one-hand operational access and visibility of the cassette container stored in the drawer and the feature of hub-lock projections which disengage automatically from the hub-openings of the inserted cassette when the drawer is moved into its cassette-exposing position. The cassette container, in accordance with this invention, having the short-drop drawer configuration as described previously, provides all of the advantages of a cassette container of this type in the environment of a block or modular storage system.

To achieve the foregoing objectives, as embodied herein and as best illustrated in FIGS. 1 and 4, the cassette container in accordance with the invention further includes mating track means formed on the top, bottom, side, and rear walls 12, 14, 16, 18, and 19, respectively, of the casing 10 for detachably connecting the casing 10 to another similar casing horizontally or vertically to form a modular storage system. The mating track means forms dovetail joints and comprises male dovetails having mating edges 102 and 104 integrally formed in the two outer side edges of the casing top wall 12 of the container and male dovetails having mating edges 106 and 108 integrally formed in the two outer side edges of one of the side casing walls, such as side casing side wall 16 as shown in FIGS. 1 and 4. Corresponding to the above male dovetails are female dovetails having mating edges 110 and 112 integrally formed on the two outer side edges of the casing bottom wall 14 and female dovetails having mating edges 114 and 116 formed on the outer side edges of the other side casing wall 18.

As can be seen, this particular configuration not only facilitates easy positioning and insertion of the dovetail joints together between the connecting casings in side-by-side relationship and/or stacked one on top of the other, but also continues to provide a broad, smooth and planar surface on the top of each casing 10 and a bottom for the casing which rests flat on the surface of a table or the like. The design of the cassette container of this invention also allows for a simple and easy integral molding of the components as a part of the casing, particularly when molding of the mating track means need be done only in the short direction on the casing.

To ensure that the casings of the containers to be connected together are in a proper front even alignment, the cassette container in accordance with this invention further includes front end alignment and locking means. In providing such a front end alignment and locking mechanism, the same criteria must be met as those described above for the container connecting mechanism. As embodied herein and as best illustrated in FIGS. 1 and 6, the locking and alignment means comprises a pair of female notches 118 and 120 formed in the forward edge of the casing top wall 12 and a female notch 122 formed in the forward edge of the side casing wall 16 having the male dovetail joints 106 and 108. Corresponding to the above female notches are male nodules 124 and 126 formed at the forward edge of the casing bottom wall 14 and a male nodule 128 formed at the forward edge of the side casing wall 18 having the female dovetail joints 114 and 116. The male nodules 124 and 126 of a container stacked on top of another container engage the female notches 118 and 120 of the bottom container. In a similar fashion, a cassette container to be connected to another container in side-by-side relationship has its male nodule 128 engaging the opposing female notch 122 of the container positioned adjacent to it.

It can be seen from the foregoing that this particular front end alignment and locking means configuration not only provides for an even front end positioning of casings to be connected together, but also one that allows for a simple and easy integral molding of the components as a part of the casing 10. It should be noted that the male nodules are such that they do not extend beyond or interfere with the front portion of the casing or project beyond the dovetailing of the casing. Therefore, for example, the bottom of the casing still rests flat on the surface of a table or the like and the female notches in the front edge of the top casing wall do not interfere with the broad, smooth and planar surface on the casing top.

In view of the foregoing written description of the preferred embodiment and accompanying drawings, it is seen that the cassette container of this invention achieves a combination of advantages and improvements in the art. First, the container of the invention allows for side insertion of a cassette into the casing onto a drawer having hub-lock projections for locking the hub openings of the cassette. Secondly, the cassette container of this type disclosed and described above provides for easy access and more visibility to the cassette, and disengagement of the hub-lock projections automatically when the drawer is moved into its outwardly and downwardly cassette-exposing position. Thirdly, the above type of cassette container is simple in construction and has components which can be more readily formed of injected molded plastic material into a two-piece or three-piece construction (with the exception of a spring biasing means). It has significant advantages over both the drawer-type cassette container and the bottomless slide type container known in the art. Fourthly, the cassette container of the type described above is manufactured with less distortion and warping of the components because the molding process can be achieved in the short direction. Fifthly, the above type of cassette container disclosed and described has a very smooth operation of the drawer in the casing between the cassette-storing position and the partially-extended downwardly cassette-exposing position. Sixthly, the cassette container of the type described above is both versatile and can allow for variations in the components' dimensions yet still maintain a very satisfactory and smooth operation of the container. Finally, it can be seen that the cassette container of a type described above can be very easily and quickly connected and very evenly and tightly aligned in the front portion in a modular block formation either stacked one on top of the other, in side-by-side relationship, or both, and yet allow easy access and insertion and removal of a cassette in the short direction.

It will be apparent to those skilled in the art that modifications and variations could be made to the above container for holding a cassette in accordance with the teachings of the invention without departing from the spirit or scope of the invention. Thus, it is intended that the present invention cover the modifications and variations of this invention within the scope of the appended claims and their equivalents.

We claim:
1. A container for holding a cassette comprising:
 (a) a rectangular casing having top, bottom and side walls, a rear wall and an open front;

(b) a drawer for holding a cassette, said drawer being reciprocally received in the casing and slidable between a cassette-storing position within the casing and a cassette-exposing position partially-extended outwardly from the casing and said drawer comprising rear walls, and a front wall and a bottom wall having a forward portion extending outwardly from the casing when the drawer is moved to its cassette-exposing position;

(c) spring means for biasing the drawer toward the cassette-exposing position;

(d) locking means for retaining the drawer in the cassette-storing position including a projection formed on the outer surface of the drawer bottom wall near the forward end thereof and a recess formed in the inner surface of the casing bottom wall near the front portion thereof for receiving the locking projection of the drawer when the drawer is in the cassette-storing position and wherein the drawer is releasingly disengaged from the cassette-storing locked position by exerting a slightly inward and upward pressure against the drawer; and (e) stop means for limiting movement of the drawer to the cassette-exposing position including a projection formed on the outer surface of the drawer bottom wall near the rear end thereof, said stop projection moveable in the recess formed in said casing bottom wall until engagement with the front edge thereof for limiting further outward movement of the drawer from the casing; and wherein the locking projection has a width greater than the stop projection and wherein the recess formed in the casing bottom wall has a T-shape configuration with the front edge thereof of a width approximately the same as the locking projection width for providing a positive locking action therebetween.

2. The container of claim 1, wherein the drawer bottom wall comprises a rear section and a front section hinged to the rear section, said rear and forward sections forming the bottom wall of said drawer for holding the cassette when said drawer is in the cassette-storing position and wherein the front section drops downwardly from the rear section when the drawer is slidably moved outwardly toward the cassette-exposing position for providing access to the cassette.

3. The container of claim 2, wherein the rear and front sections of the drawer bottom wall are formed of a single piece of molded material having a reduced thickness to form a hinge line between the sections running substantially parallel to said front and rear walls of said drawer.

4. The container of claim 3, wherein said drawer bottom wall is formed of a single piece of molded material in the open cassette-exposing position for providing a natural downward hinged bias in the bottom wall of the drawer.

5. The container of claims 3 or 4, wherein the rear, front, and bottom walls of the drawer are formed of a single piece of molded material.

6. The container of claim 2, 3, or 4, wherein said drawer further comprises side walls formed on the rear section of the drawer bottom wall.

7. The container of claim 6, wherein the rear, front, side, and bottom walls of the drawer are formed of a single piece of molded material.

8. The container of claim 6, wherein said drawer further comprises partial side support walls formed on the forward section of the drawer bottom wall adjacent the drawer front wall.

9. The container of claim 2, wherein said drawer bottom wall is formed of two pieces of molded material comprising the front and rear sections and wherein the front section is mechanically hinged to the rear section.

10. The container of claim 9, wherein nodules and corresponding mating holes are formed respectively on the front and rear sections of said drawer bottom wall for forming the mechanical hinge between the front and rear sections, the front section being mechanically hinged and moved downwardly by gravity from the rear section when the drawer is in the cassette-exposing position.

11. The container of claim 10, wherein said nodules and holes are formed as integral molded parts of the front and rear drawer bottom wall sections.

12. The container of claim 9, wherein said drawer further comprises side walls formed on the rear section of the drawer bottom wall.

13. The container of claim 12, wherein the side walls are formed as integral parts of the rear drawer bottom wall section.

14. The container of claim 12, wherein said drawer further comprises partial side support walls formed on the forward section of the drawer bottom wall adjacent the drawer front wall.

15. The container of claim 13 or 14, wherein the side support walls are formed as integral parts of the front drawer bottom wall section.

16. The container of claim 1, 2, 3, or 9, wherein the forward portion of the drawer bottom wall extends downwardly approximately 45° from the horizontal when the drawer is in the cassette-exposing position.

17. The container of claim 1, 2, 3, or 9, further comprising hub-lock means for lockingly engaging hub-openings of an inserted cassette only when the drawer is in the cassette-storing position, said hub-lock means comprising hub-lock projections mounted on said forward portion of said drawer bottom wall for engaging the hub-openings of the inserted cassette in the cassette-storing position and wherein said hub-lock projections drop away from the cassette when the forward portion of the drawer bottom wall extends downwardly in the cassette-exposing position.

18. The container of claim 17, wherein the forward portion of the drawer bottom wall extends downwardly approximately 45° from the horizontal when the drawer is in the cassette-exposing position.

19. The container of claim 1, 2, 3, or 9, wherein a relief is formed along the inner front surface of the casing top wall so that when the cassette is inserted into the container with the head of the cassette facing the open front end of the casing, the drawer can be releasably unlocked by a slightly inward and upward motion without interference of the head of the cassette with the inner front surface of the casing top wall.

20. The container of claim 1, 2, 3, or 9, wherein a relief is formed along the inner front surface of the casing top wall so that when the cassette is inserted into the container with the head of the cassette facing the open front end of the casing, the drawer can be releasably unlocked by a slightly inward and upward motion without interference of the head of the cassette with the inner front surface of the casing top wall.

21. The container of claim 1, 2, 3, or 9, wherein said stop means comprises a projection formed on the outer surface of the drawer bottom wall near the rear end thereof and a recess formed in the inner surface of the casing bottom wall near the front end thereof, said stop projection engaging the recess formed in the forward end of said bottom wall of said casing for limiting further outward movement of the drawer from the casing.

22. The container of claim 21, wherein the stop projection engages the recess for establishing a pivotal point of the forward portion downwardly from the rear section of the drawer bottom wall at the outer front edge of the casing bottom wall.

23. The container of claim 1, 2, 3, or 9, wherein the locking and stopping projections are formed as sawtooth like projections and wherein the front edge of the recess is formed at an acute angle to provide a more positive locking and stopping action with the mating projections.

24. The container of claim 1, 2, 3, or 9, wherein the recess comprises a through slot in the casing bottom wall.

25. The container of claim 23, wherein the recess comprises a through slot in the casing bottom wall.

26. A container for holding a cassette comprising:
(a) a rectangular casing having top, bottom and side walls, a rear wall and an open front;
(b) a drawer for holding a cassette, said drawer being reciprocally received in the casing and slidable between a cassette-storing position within the casing and a cassette-exposing position partially-extended outwardly and downwardly away from the cassette and said drawer comprising rear and front walls, and a bottom wall having a forward portion extending downwardly away from the cassette when the drawer is moved outwardly from the casing to its cassette-exposing position;
(c) spring means for biasing the drawer toward the cassette-exposing position;
(d) locking means for retaining the drawer in the cassette-storing position including a projection formed on the outer surface of the drawer bottom wall near the forward end thereof and a recess, formed along the casing bottom wall from the front end to the middle thereof, for receiving the locking projection of the drawer when the drawer is in the cassette-storing position and wherein the drawer is releasingly disengaged from the cassette-storing locked position by exerting a slightly inward and upward pressure against the drawer; and
(e) stop means for limiting movement of the drawer to the cassette-exposing position including a projection formed on the outer surface of the drawer bottom wall near the rear end thereof, said stop projection moveable in the recess formed in said casing bottom wall until engagement with the front edge thereof for limiting further outward movement of the drawer from the casing, and wherein the locking projection has a width greater than the stop projection and wherein the recess formed in the casing bottom wall has a T-shape configuration with the front edge thereof of a width approximately the same as the locking projection width for providing a positive locking action therebetween.

27. The container of claim 1, 2, 3, or 9, further comprising drawer guide means for maintaining the drawer in its proper reciprocal sliding position in and out of the casing between the cassette-storing position and the cassette-exposing position, the drawer guide means comprising a pair of ribs formed parallel to the casing side walls on the inner surface of the casing top wall and a pair of slots formed in the upper edge of the drawer rear wall for accommodating the pair of ribs.

28. The container of claim 27, wherein the pair of drawer guide ribs extend along the top casing wall to the front edge of the casing opening for providing easy and proper sliding of the drawer in and out of the casing.

29. The container of claim 1, wherein said spring means comprises a spring positioned between the rear wall of the casing and the rear wall of the drawer for biasing the drawer toward the cassette-exposing position.

30. The container of claim 29, wherein the spring comprises a spring which collapses inside itself.

31. The container of claim 30, wherein the spring comprises an hourglass-type spring.

32. The container of claim 1, 2, 3, or 9, further comprising spring guide means for providing easy and proper alignment of the spring means during assembly insertion into the casing, the spring guide means comprising a pair of ribs formed parallel to the casing side walls on the inner surface of the casing bottom wall and a pair of slots formed in the lower edge of the drawer rear wall and the drawer bottom wall for accommodating the pair of ribs.

33. The container of claim 32, wherein said spring means comprises a spring positioned between the rear wall of the casing and the rear wall of the drawer for biasing the drawer toward the cassette-exposing position and wherein the spring is located between the pair of spring guide ribs formed on the inner surface of the casing bottom wall and the corresponding drawer slots.

34. The container of claim 32, wherein the spring guide ribs are formed only in the rear portion of the casing and wherein the drawer slots are formed only in the rear portion of the drawer.

35. The container of claim 34, wherein said spring means comprises a spring positioned between the rear wall of the casing and the rear wall of the drawer for biasing the drawer toward the cassette-exposing position and wherein the spring is located between the pair of spring guide ribs formed on the inner surface of the casing bottom wall and the corresponding drawer slots.

36. The container of claim 29, wherein a pair of vertical ribs are formed on the outer surface of the drawer rear wall for positioning and alignment of one end of the spring therebetween and a knob is formed on the inner surface of the casing rear wall for positioning the other end of the spring during assembly insertion into the casing and for positive location between the rear walls of the casing and drawer.

37. The container of claim 36, wherein a pair of vertical ribs are formed on the outer surface of the drawer rear wall for positioning and alignment of one end of the spring therebetween and a knob is formed on the inner surface of the casing rear wall for positioning the other end of the spring during assembly insertion into the casing and for positive location between the rear walls of the casing and drawer.

38. The container of claim 36, wherein a projection is formed between the pair of vertical ribs on the outer surface of the drawer rear wall for alignment of the spring between the ribs.

39. The container of claim 1, 2, 3, or 9, further comprising a pair of ribs formed on the inner surface of said drawer bottom wall extending between the front and rear walls of said drawer for positioning the thinner portion of the cassette thereon and holding the cassette in the drawer in a horizontal position.

40. The container of claim 39, wherein the ribs formed on the inner surface of the drawer bottom wall run substantially parallel to each other and at a distance to allow the head of the cassette to rest on the drawer bottom wall between the ribs when the cassette is inserted either with the head toward the rear end of the drawer or the head facing the front end of the drawer.

41. The container of claim 40, wherein the ribs are formed along both the front and rear portions of the drawer bottom wall.

42. The container of claim 1, wherein the drawer bottom wall is formed of a single piece of flexible molded material and wherein the drawer bottom wall is molded in the open cassette-exposing position for providing a natural downward bias in the forward portion of the molded material for the drawer bottom wall and flexible upwardly to form a horizontal drawer bottom wall when the drawer is in the cassette-storing position.

43. The container of claim 42, wherein the rear, front, and bottom walls of the drawer are formed of a single piece of molded material.

44. The container of claim 42, wherein said drawer further comprises side walls formed on the rear section of the drawer bottom wall.

45. The container of claim 44, wherein the rear, front, side, and bottom walls of the drawer are formed of a single piece of molded material.

46. The container of claim 44, wherein said drawer further comprises partial side support walls formed on the forward section of the drawer bottom wall adjacent the drawer front wall.

47. The container of claim 46, wherein the side support walls are formed as integral parts of the front drawer bottom wall section.

48. The container of claim 42, wherein the forward portion of the drawer bottom wall extends downwardly approximately 45° from the horizontal when the drawer is in the cassette-exposing position.

49. The container of claim 42, further comprising hub-lock means for lockingly engaging hub-openings of an inserted cassette only when the drawer is in the cassette-storing position, said hub-lock means comprising hub-lock projections mounted on said forward portion of said drawer bottom wall for engaging the hub-openings of the inserted cassette in the cassette-storing position and wherein said hub-lock projections drop away from the cassette when the forward portion of the drawer bottom wall extends downwardly in the cassette-exposing position.

50. The container of claim 42 or 49, wherein a relief is formed along the inner front surface of the casing top wall so that when the cassette is inserted into the container with the head of the cassette facing the open front end of the casing, the drawer can be releasably unlocked by a slightly inward and upward motion without interference of the head of the cassette with the inner front surface of the casing top wall.

51. The container of claim 42 or 49, wherein said stop means comprises a projection formed on the outer surface of the drawer bottom wall near the rear end thereof and a recess formed in the inner surface of the casing bottom wall near the front end thereof, said stop projection engaging the recess formed in the forward end of said bottom wall of said casing for limiting further outward movement of the drawer from the casing.

52. The container of claim 51, wherein the stop projection engages the recess for establishing a pivotal point of the forward portion downwardly from the rear section of the drawer bottom wall at the outer front edge of the casing bottom wall.

53. The container of claim 52, wherein the recess comprises a recess formed along the casing bottom wall from the front to the portion of the casing bottom wall, said stopping projection moveable in the recess until engagement with the front edge thereof.

54. The container of claim 53, wherein the locking and stopping projections are formed as saw-tooth like projections and wherein the front edge of the recess is found at an acute angle to provide a more positive locking and stopping action with the mating projections.

55. The container of claim 53, wherein the recess comprises a through slot in the casing bottom wall.

56. The container of claim 42 or 49, further comprising drawer guide means for maintaining the drawer in its proper reciprocal sliding position in and out of the casing between the cassette-storing position and the cassette-exposing position, the drawer guide means comprising a pair of ribs formed parallel to the casing side walls on the inner surface of the casing top wall and a pair of slots formed in the upper edge of the drawer rear wall for accommodating the pair of ribs.

57. The container of claim 42 or 49, wherein said spring means comprises a spring positioned between the rear wall of the casing and the rear wall of the drawer for biasing the drawer toward the cassette-exposing position.

58. The container of claim 57, further comprising spring guide means for providing easy and proper alignment of the spring means during assembly insertion into the casing, the spring guide means comprising a pair of ribs formed parallel to the casing side walls on the inner surface of the casing bottom wall and a pair of slots formed in the lower edge of the drawer rear wall and the drawer bottom wall for accommodating the pair of ribs.

59. The container of claim 58, wherein said spring means comprises a spring positioned between the rear wall of the casing and the rear wall of the drawer for biasing the drawer toward the cassette-exposing position and wherein the spring is located between the pair of spring guide ribs formed on the inner surface of the casing bottom wall and the corresponding drawer slots.

60. The container of claim 59, wherein the spring guide ribs are formed only in the rear portion of the casing and wherein the drawer slots are formed only in the rear portion of the drawer.

61. The container of claim 1, 2, 3, 9, or 42, further comprising mating track means formed on the top and bottom and side walls of the casing for detachably connecting the casing to another similar casing horizontally or vertically to form a block, the track means forming dovetail joints and comprising male dovetails having mating edges formed on the outer longitudinal edges of the casing top wall and one of the casing side walls and female dovetails having mating edges formed on the outer longitudinal edges of the casing bottom wall and the other of the casing side walls.

62. The container of claim 61, further comprising locking means for positioning the casings to be connected together in a front even alignment, the locking and positioning means comprising female notches formed in the forward edge of the casing top wall and one of the casing side walls and male nodules formed at the forward edge of the casing bottom wall and the other of the casing side walls.

63. The container of claim 62, wherein the dovetail joints and locking and positioning means are integrally formed with the casing from a single piece of molded material.

64. The container of claim 59, further comprising mating track means formed on the top and bottom and side walls of the casing for detachably connecting the casing to another similar casing horizontally or vertically to form a block, the track means forming dovetail joints and comprising male dovetails having mating edges formed on the outer longitudinal edges of the casing top wall and one of the casing side walls and female dovetails having mating edges formed on the outer longitudinal edges of the casing bottom wall and the other of the casing side walls.

65. The container of claim 64, further comprising locking means for positioning the casings to be connected together in a front even alignment, the locking and positioning means comprising female notches formed in the forward edge of the casing top wall and one of the casing side walls and male nodules formed at the forward edge of the casing bottom wall and the other of the casing side walls.

66. The container of claim 65, wherein the dovetail joints and locking and positioning means are integrally formed with the casing from a single piece of molded material.

* * * * *

UNITED STATES PATENT AND TRADEMARK OFFICE
CERTIFICATE OF CORRECTION

PATENT NO. : 4,399,913

DATED : Aug. 23, 1983

INVENTOR(S) : Gelardi et al.

It is certified that error appears in the above-identified patent and that said Letters Patent is hereby corrected as shown below:

Front page [56] References Cited, "4,087,145 4/1978 Weavers" should be --4,087,145 5/1978 Weavers--.

Column 8, line 38, "downwad" should be --downward--.

Signed and Sealed this

Thirteenth Day of March 1984

[SEAL]

Attest:

GERALD J. MOSSINGHOFF

Attesting Officer     Commissioner of Patents and Trademarks